United States Patent
Nabielec et al.

(10) Patent No.: US 9,356,720 B2
(45) Date of Patent: May 31, 2016

(54) SYSTEM AND A METHOD FOR SYNCHRONIZATION AND TRANSMISSION OF INFORMATION IN A DISTRIBUTED MEASUREMENT AND CONTROL SYSTEM

(71) Applicant: AKADEMIA GORNICZO-HUTNICZA IM. STANISLAWA STASZICA W KRAKOWIE, Cracow (PL)

(72) Inventors: Jerzy Nabielec, Crakow (PL); Andrzej Wetula, Cracow (PL)

(73) Assignee: AKADEMIA GORNICZO-HUTNICZA IM. STANISLAWA STASZICA W KRAKOWIE, Cracow (PL)

(*) Notice: Subject to any disclaimer, the term of this patent is extended or adjusted under 35 U.S.C. 154(b) by 106 days.

(21) Appl. No.: 14/133,682

(22) Filed: Dec. 19, 2013

(65) Prior Publication Data

US 2014/0177655 A1    Jun. 26, 2014

(30) Foreign Application Priority Data

Dec. 24, 2012 (PL) .......................................... 402220
Dec. 24, 2012 (PL) .......................................... 402221

(51) Int. Cl.
*H04J 3/06* (2006.01)

(52) U.S. Cl.
CPC .............. *H04J 3/0638* (2013.01); *H04J 3/0667* (2013.01)

(58) Field of Classification Search
CPC ............................... H04J 3/0638; H04J 3/0667
USPC ........................... 370/330, 436, 468, 503–508
See application file for complete search history.

(56) References Cited

U.S. PATENT DOCUMENTS

| | | | | |
|---|---|---|---|---|
| 7,738,500 B1 * | 6/2010 | Jones et al. | ............ | 370/503 |
| 7,957,295 B2 * | 6/2011 | Varma et al. | ............ | 370/241 |
| 9,043,389 B2 * | 5/2015 | Ramadas | ............ | 709/203 |
| 2006/0095944 A1 * | 5/2006 | Demircin et al. | ............ | 725/81 |
| 2010/0074134 A1 * | 3/2010 | Tatsuta et al. | ............ | 370/252 |
| 2012/0163353 A1 * | 6/2012 | Cordeiro | ............ | 370/338 |
| 2012/0320794 A1 * | 12/2012 | Belhadj et al. | ............ | 370/254 |
| 2013/0058405 A1 * | 3/2013 | Zhao et al. | ............ | 375/240.12 |
| 2013/0170388 A1 * | 7/2013 | Ito et al. | ............ | 370/252 |
| 2014/0241381 A1 * | 8/2014 | Hamamatsu et al. | ............ | 370/508 |

* cited by examiner

*Primary Examiner* — Phuc Tran
(74) *Attorney, Agent, or Firm* — Mark M. Friedman

(57) ABSTRACT

A method for synchronization and transmission of information in a distributed measurement and control system, wherein frames, being a sequence of bits, are transmitted between a master node (M) and a slave node (S), the method comprising cyclically performing the steps of: receiving (101) at the master node (M) an echo frame sent from the slave node (S) as an echo of the last frame received by the slave node (S) from the master node (M); determining (102) the time of frame propagation between sending the frame from the master node (M) and receiving the echo frame at the master node (M); constructing (103) a subsequent frame at the master node (M), the subsequent frame comprising a data field comprising a time adjustment dependent on the determined time of frame propagation; sending (104) the subsequent frame from the master node (M) to the slave node (S); receiving (105) the subsequent frame at the slave node (S); and adjusting (106) a timer (S_T) of the slave node (S) depending on the value of the time adjustment read from the received subsequent frame and sending the received frame to the master node (M) as an echo frame.

6 Claims, 4 Drawing Sheets

SYSTEM AND A METHOD FOR SYNCHRONIZATION AND TRANSMISSION OF INFORMATION IN A DISTRIBUTED MEASUREMENT AND CONTROL SYSTEM

BACKGROUND OF THE INVENTION

1. Field of the Invention

The present invention relates to a system and a method for synchronization and transmission of information in a distributed measurement and control system. In particular, it may be used for real time transmission of information between physically connected nodes of an optical fiber network.

2. Description of the Related Art

The IEEE1588 standard enables synchronization of nodes which are distanced from each other up to 100 m, which corresponds to the maximum allowed length of an Ethernet link. Synchronization frames are transmitted between a master and a slave device, and the slave device should compute data necessary to adjust its own clock system.

The IEEE1588 standard requires at least four Ethernet frames to be transmitted between the devices in order to perform a single synchronization operation. These frames are used for synchronization only and do not carry any further useful information. The synchronization procedure is repeated every 1 ms. In order to transmit data, separate Ethernet frames must be used. Therefore, synchronization and data transmission according to IEEE1588 cannot be performed simultaneously.

Another transmission system is known from a publication by L. Sliwczynski, P. Krehlik, L. Buczek and M. Lipinski entitled "Active Propagation Delay Stabilization for Fiber-Optic Frequency Distribution Using Controlled Electronic Delay Lines" (IEEE TRANSACTIONS ON INSTRUMENTATION AND MEASUREMENT, VOL. 60, NO. 4, APRIL 2011). In that system, time markers are transmitted cyclically from a master node to a slave node, and the slave node returns the markers immediately to the master node. Due to the fact that the time of signal propagation is the same in both directions, the master node computes a time adjustment, which it then implements in its clock circuits in such a way that the time markers are sent to the slave with such time advance that the time markers in both devices appear at the same time point specified on a common time scale. The signals transmitted between the master node and the slave node in both directions do not carry any data. Such system enables precise synchronization of remote nodes, but does not enable simultaneous data transmission.

Switches used in transmission systems, such as switches used in Ethernet networks, transmit information frames received at their input to a specified output, depending on the address included in the frame header.

Isochronous real time (IRT) switches, such as the SCALANCE X204IRT switch, store received information in registers and transmit it to defined outputs at times specified by their internal clock.

There are also known hubs, which can be used as switches, and which send information received on all inputs to all outputs without any analysis of the information and without allocating those transmissions in time, which results in collisions.

SUMMARY OF THE INVENTION

The presented method relates to synchronization and transmission of information in a distributed measurement and control system, wherein frames, being a sequence of bits, are transmitted between a master node and a slave node, the method comprising cyclically performing the steps of: receiving at the master node an echo frame sent from the slave node as an echo of the last frame received by the slave node from the master node; determining the time of frame propagation between sending the frame from the master node and receiving the echo frame at the master node; constructing a subsequent frame at the master node, the subsequent frame comprising a data field comprising a time adjustment dependent on the determined time of frame propagation; sending the subsequent frame from the master node to the slave node; receiving the subsequent frame at the slave node; adjusting a timer of the slave node depending on the value of the time adjustment read from the received subsequent frame and sending the received frame to the master node as an echo frame.

Preferably, the method further comprises setting a value of an echo delay time field in the frame sent from the master node to the slave node and, at the slave node, sending the received frame as an echo frame after expiry of the echo delay time.

There is also presented a distributed measurement and control system comprising a master node and a slave node connected by a physical signal transmission link. The master node comprises a digital module configured to: receive an echo frame sent from the slave node as an echo of the last frame received by the slave node from the master node; determine the time of frame propagation between sending the frame from the master node and receiving the echo frame at the master node; construct a subsequent frame, the subsequent frame comprising a data field comprising a time adjustment dependent on the determined time of frame propagation; send the subsequent frame from the master node to the slave node. The slave node comprises a digital module configured to: receive the subsequent frame; adjust a timer of the slave node depending on the value of the time adjustment read from the received subsequent frame and send the received frame to the master node as an echo frame.

Preferably, the digital module of the master node comprises: a timer; a frame counter having its input connected to the output of the timer; a delay counter having its one of two inputs connected to the output of the timer; a master actuated device having its input connected to the output of the timer; a master transmission buffer having its one input connected via a bus with the output of the frame counter and its second input connected via a bus to the output of the delay counter output; a master shift transmitting register having its input connected via a bus with the output of the master transmission buffer and an output as a serial signal output for the slave node; an input of a serial signal from the slave node connected to a master echo decoder and to a master shift receiving register, the master echo decoder having its output connected to the second input of the delay counter and to the master shift receiving register; and a direct memory access register to which the outputs of the frame counter, master actuated device and master shift receiving register are connected via buses.

Preferably, the digital module of the slave node comprises: an input of a serial signal from the master node connected to a slave shift receiving register and to a synchronisation signal detector having its output connected to the input of the slave shift receiving register; a slave timer having its inputs connected to the output of the slave shift receiving register via a bus and to the output of the synchronisation signal detector; a slave actuated device having its input connected to the output of the slave timer and its output connected via a bus to a slave transmitting buffer, the slave transmitting buffer having its other input connected via a bus to the output of the slave shift receiving register and its output connected via a bus to a slave shift transmitting register; the slave shift transmitting register having its second input connected to the output of the slave timer and its output as a serial signal output for the master node.

Preferably, the system further comprises a switch connected between a higher level node being a master node or another switch and a plurality of lower level nodes being slave nodes or other switches, the switch configured to transmit information without modification to information contents and with a delay identical in both transmission directions.

Preferably, the switch comprises: an input block having an input connected to a higher level node and a plurality of outputs connected to lower level nodes; an output block having a plurality of inputs connected to a lower level nodes and an output connected to a higher level node; a decision block comprising: a shift receiving register and a signal detector connected to the input block; a timer having its one input connected via a bus to the shift receiving register and another input connected to the signal detector and an output connected to the output block.

The advantage of the presented method and system is that it is not necessary to make pauses between transmitted frames, because the frames perform both synchronization and data transmission functions. Furthermore, the presented method enables synchronization of nodes in fiber optic networks over distances larger than the range of a single laser module, even over distances of thousands of kilometers, involving use of optic signal amplifiers.

The presented solution enables obtaining low specification uncertainty and low timer jitter, being at the level of a few nanoseconds, for data transmitted between devices which can be hundreds of kilometers distant from each other.

BRIEF DESCRIPTION OF DRAWINGS

The system and the method are presented by means of example embodiments on a drawing, wherein.

DETAILED DESCRIPTION OF THE PREFERRED EMBODIMENTS

Figure 1:
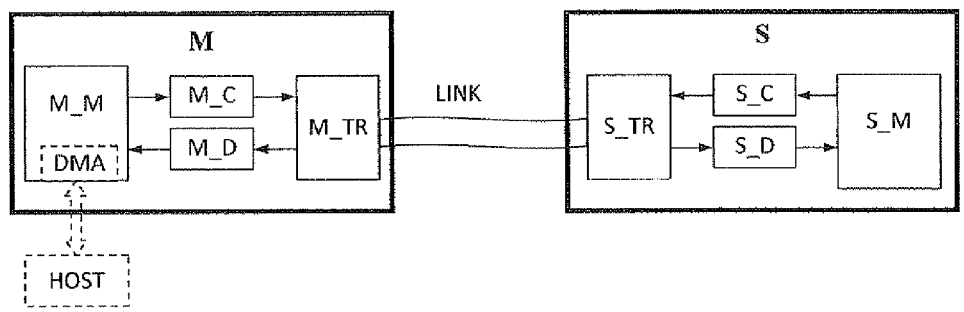
FIG. 1 presents a diagram of a system with a master node and a slave node connected directly.
Figure 2:
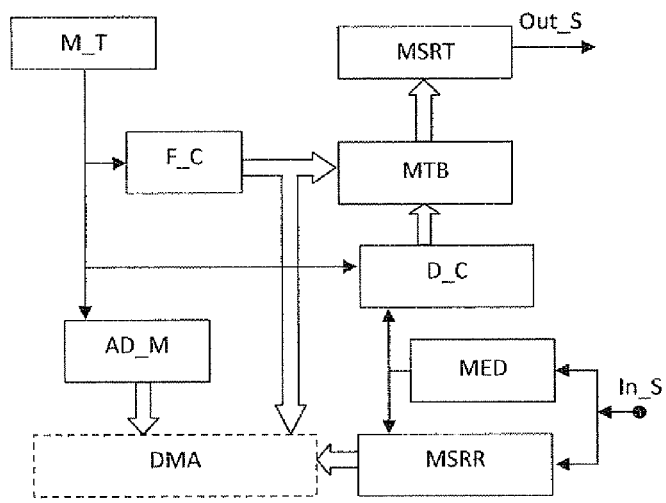
FIG. 2 presents a diagram of a master node digital module.

As shown in FIG. 1, the master node M and the slave node S are connected by means of a physical link—LINK. The master node contains a digital module M_M, a coder M_C, and a decoder M_D, as well as a master transmission and reception module M_TR. Similarly, the slave node S contains a slave digital module S_M, a coder S_C, and a slave decoder S_D, as well as a slave transmission and reception module S_TR. Kusi transmitter oraz receiver, ale niech tak zostanie In the digital module M_M of the master node, as shown in FIG. 2, the output of the master timer M_T is connected to the inputs of a frame counter F_C, the first input of the delay counter D_C and a master actuated device AD_M. The outputs of the frame counter F_C and the delay counter D_C are connected by a bus with the inputs of a master transmission buffer MTB. The output of the master transmission buffer MTB is connected, also by a bus, to an input of a master shift transmission register MSRT and further on, serially, to a signal output Out_S, wherein the Out_S signal is to be transmitted to a slave node. The serial signal input In_S from the slave node is connected to the master echo decoder MED and to the first input of a master shift receiving register MSRR. The output of the master echo decoder MED is connected to the second input of the master shift receiving register MSRR and to the second input of the delay counter D_C. Furthermore, there is a bus from the master actuated device being the master analogue/digital converter AD_M, from the shift receiving register MSRR, and from the frame counter F_C output to the direct memory access DMA register.

Figure 3:
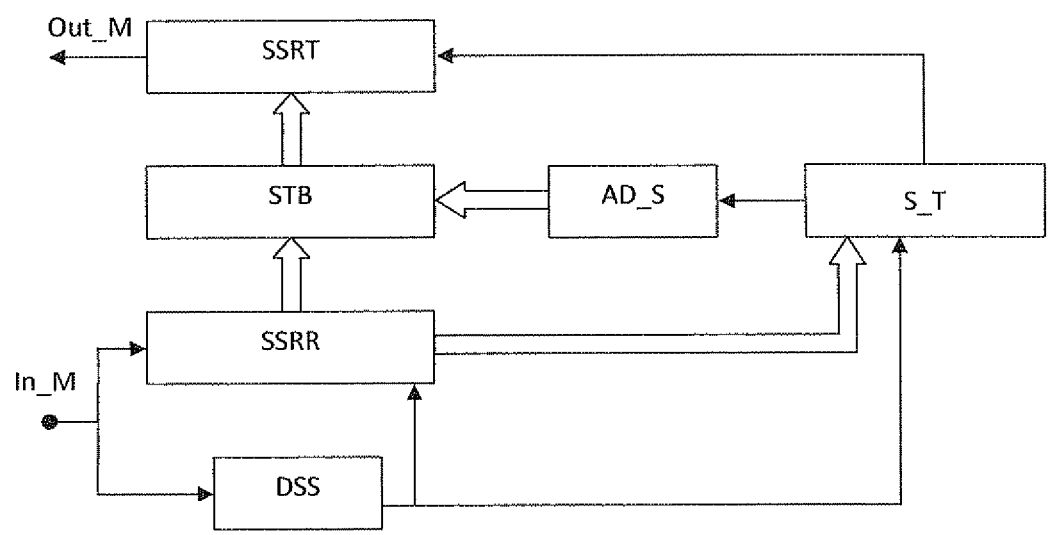
FIG. 3 presents a diagram of a slave node.

In the digital module S_M of the slave node, as shown in FIG. 3, the serial signal input from the master node In_M is connected to the input of a synchronization signal detector DSS and to the first input of the slave shift receiving register SSRR. The output of the synchronization signal detector DSS is connected to the second input of the slave shift receiving register SSRR and to a second input of a slave timer S_T. The first output of the slave timer S_T is connected with a slave actuated device AD_S, which is an analogue/digital converter, and the second output of the slave timer S_T is connected to the second input of a slave shift transmission register SSRT. The output of the slave shift transmission register SSRT is connected to the serial signal output Out_M connected to the master node. Furthermore, a bus runs from the first slave shift receiving register SSRR output to the first timer input S_T, from the second slave shift receiving register SSRR output to the first slave transmission buffer STB input, and from the slave actuated device AD_S to the second slave transmission buffer STB input, and from the slave transmission buffer STB output to the first slave shift transmission register SSRT input.

In one example embodiment, all elements of the digital module M_M of the master node as shown in FIG. 2 can be implemented as an FPGA module (VIRTEX) and analogue/digital converters installed on NI PXI 7853R board. Elements of the digital module S_M of the slave node as shown in FIG. 3 can be implemented as an FPGA module (SPARTAN) installed in a single-board unit sbRIO 9602 with reconfigurable inputs and outputs and analogue/digital converters NI 9215E.

In alternative embodiment, the digital module M_M of the master node can also be implemented similarly to the slave node, in an FPGA (SPARTAN) installed on a single-board unit sbRIO 9602.

The transmission and synchronization of information in the distributed measurement and control system involves transmission of an ordered sequence of bits between the master M and the slave S nodes by means of transmission and reception modules SFP via a fiber-optic link—Link. All signals transmitted in both directions between the maser M and the slave S pass through a coder and a decoder in the Manchester standard.

Upon receiving frames from the master node M, the slave node S returns the frames as an echo to the master node M immediately or after a known and predetermined time interval, wherein adjustment resulting from the propagation time are hardware computed on a current basis. Next, the adjustment is sent from the master node M to the slave node S in defined data fields of cyclically transmitted frames. In the slave node S, after having received each such adjustment, the configuration parameter in the slave timer S_T is adjusted, thus synchronizing the times of operations performed by both nodes. In another embodiment, the slave node echo is returned after the delay time specified in the defined data fields of the frame transmitted from the master node to the slave node.

Frames of a fixed structure are transmitted between the master node and the slave node. For example, the frames can be 200 bits long. Each frame contains the following fields:
- a preamble, containing at least 18 bits, each having a value of "1",
- data fields, consisting of a starting bit having a value of "0", an ending bit having a value of "1" and 16 bits of data in between,
- stuffing bits, having a value of "1".

The following data fields can be included in the frame:
- an index field,
- an adjustment field,
- an echo delay time field,
- measurement results or other data.

The frame is recognizable by the end of the preamble, which indicates the beginning of the first data field.

The master node M sends the frames of the above structure to the slave node S in cycles. Upon transmission of the time marker, the delay counter D_C is started in the master node, and the frame counter F_C is incremented. The current value of the frame counter F_C is transmitted to the master transmission buffer MTB where it is placed in the index field of the frame being sent. Upon receiving a frame, the slave node S returns that frame after a defined time following the reception, to the master node as an echo frame. The frame serially received by the master node M from the slave node S, having passed the SFP module receiver and the Manchester decoder, is serially transferred into the master shift receiving register MSRR and to the master echo decoder MED. The master echo decoder MED detects the time marker in the received frame, being the end of the preamble, and that event stops the delay counter D_C determining the adjustment. The adjustment is transmitted to the master transmission buffer MTB, where it is placed in the adjustment field of the frame being sent to the slave node in the next cycle of the system operation. The master transmission buffer MTB sends a concurrently created frame to the master shift transmission register MSRT wherefrom the information is serially transmitted via the coder and laser module SFP to the slave node. The serially received data contained in the echo of the master shift receiving register MSRR are concurrently copied to the direct memory access DMA register. The output signal from the master echo detector MED precisely defines fields of the frame structure of the serially received data. The frame counter F_C increment signal is simultaneous with the command to start the operation of the master actuated device AD_M. In that embodiment, it is an analogue/digital converter. Also, information obtained from the frame counter F_C and from the master actuated device AD_M is concurrently copied to the direct memory access DMA register. The direct memory access register DMA is used to transmit the results of a measurement sequence to a higher level IT host unit, e.g. a PC.

Serial-parallel conversion of information transmitted over the link is performed in the slave node S in a manner equivalent to the master node. The time marker is detected in an equivalent manner by the synchronization signal detector DSS and the data structure in the received frames is specified. The value of the adjustment is read in the slave shift receiving register SSRR and sent concurrently to the slave timer S_T, resulting in adjustment of its operation. The slave timer transmits trigger signals to the slave actuated device AD_S at time points specified by the adjustment. This way, the actuated devices both in the master node and the slave node perform their operation synchronously.

Taking in to account the received "echo delay time" parameter in the slave timer S_T, results in the echo being returned to the master node after a time which is individually preset.

Figure 4:
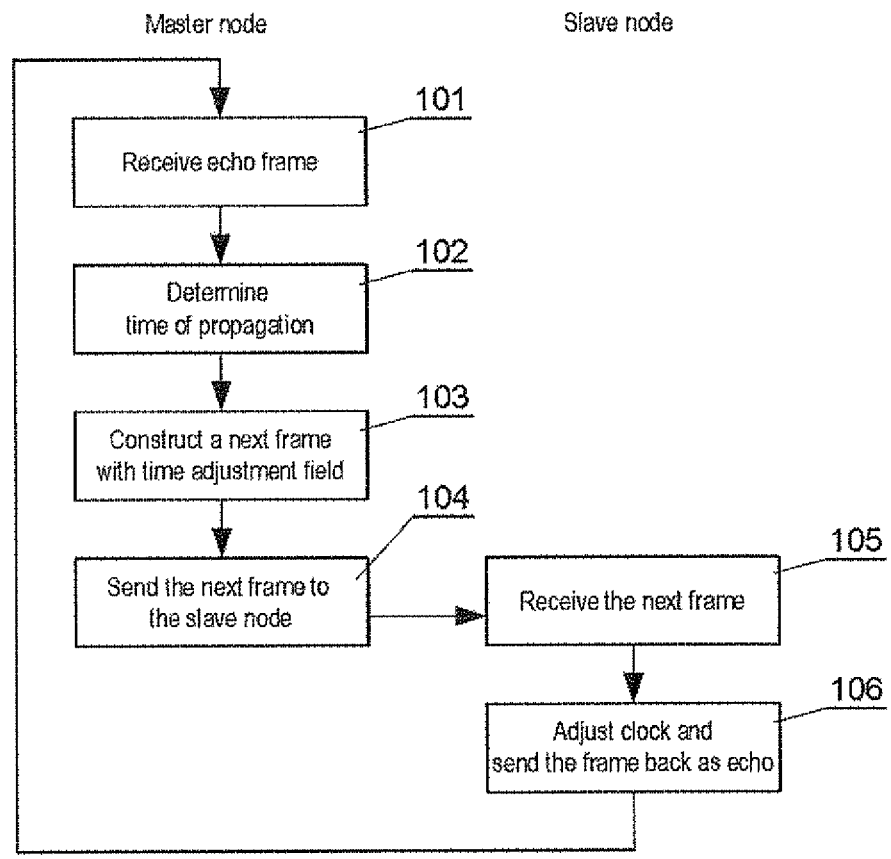
FIG. 4 presents a flow diagram of the method.

FIG. 4 illustrates and summarizes the method. The steps are performed cyclically. In step 101 a frame is received at the master node M, which is an echo frame sent from the slave node S as an echo of the last frame received by the slave node S from the master node M. Next, in step 102, the time of frame propagation between sending the frame from the master node M and receiving the echo frame at the master node M is determined. Then, in step 103, a subsequent frame is constructed at the master node M, the subsequent frame comprising a data field comprising a time adjustment dependent on the determined time of frame propagation. The frame is sent in step 104 and received in step 105 by the slave node S. In step 106, the slave timer S_T is adjusted depending on the value of the time adjustment read from the received subsequent frame and the received frame is sent back to the master node M as an echo frame.

Figure 5:
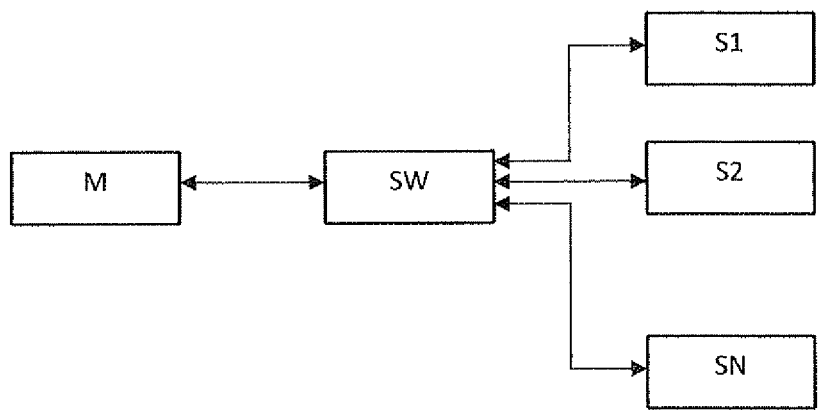
FIG. 5 presents another diagram of a system with a master node connected with a plurality of slave nodes via a switch.

FIG. 5 presents a transmission system wherein a master node M is connected with a plurality of slave nodes S1 . . . SN via a switch SW, having a structure as shown in FIG. 6 or FIG. 7.

Figure 6:
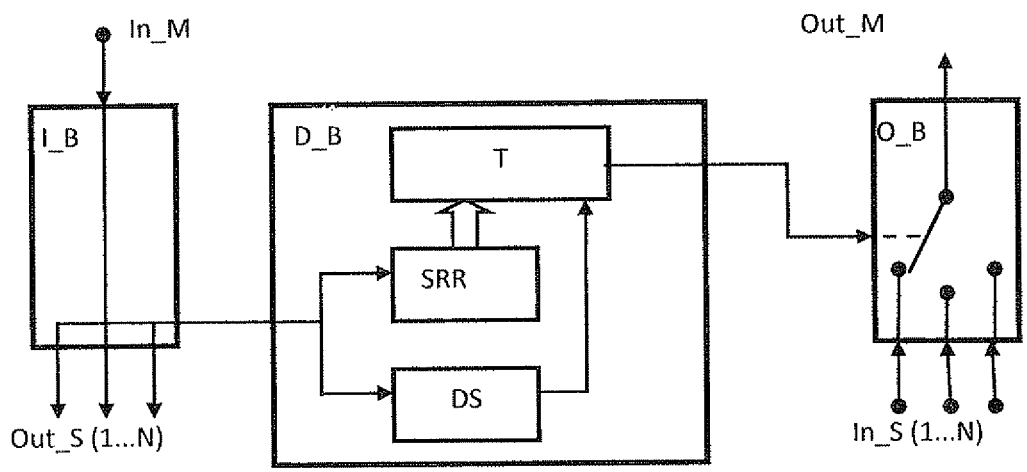
FIG. 6 presents a diagram of a switch.

The one embodiment of the switch SW as shown in FIG. 6, the switch SW comprises an input block I_B, a decision block D_B, and an output block O_B. The input block I_B has an input for data transfer path from a higher level node In_M, outputs for data transfer paths to lower level nodes Out_S (1 . . . N) and a link via the decision block D_B data transmission path to the input of the switch receiving register SRR and the detector DS input. Within the decision block D_B, the detector DS output is connected with a single line path to the input of the timer T. Furthermore, there is a bus connection between the switch receiving register SRR and the timer T. The output block O_B is a multiplexer controlled by a timer T from the decision block. It is also equipped with a data transmission line output to the higher level node, Out_M, as well as data transmission line inputs from lower level nodes, In_S (1 . . . N).

Figure 7:
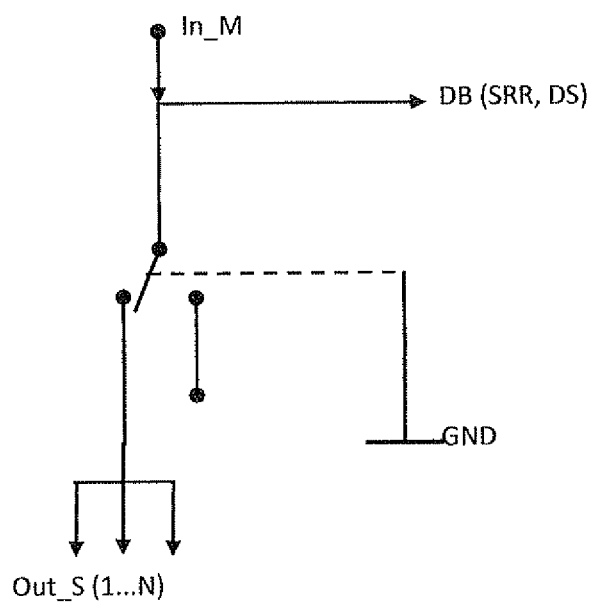
FIG. 7 presents a diagram of an input block of a switch utilizing a non-commuted demultiplexer.

As shown in FIG. 7, the non-commuted demultiplexer in the input block I_B is the input block of the same data propagation time characteristics as the multiplexer in the output block O_B, but its controls have set and permanent values. In this circuit, the control path of the applied demultiplexer is wired to the digital ground GND. The remaining connections of the input block (I_B) and the elements and connections of the decision block and the output block are the same as in the slave device.

The elements of the decision block in the example switches, that is the detector DS, the switch receiving register SRR and the timer T, are implemented in an FPGA unit installed on a single-board sbRIO 9602 unit with re-configurable inputs and outputs. In the output block, the multiplexer section of the MAX9394 multiplexer-demultiplexer has been implemented.

In the circuit shown in FIG. 7, a demultiplexer section of the MAX9394 multiplexer-demultiplexer was used in the input block, retaining controls with set and permanent values.

The demultiplexer on the input I_M of the input block receives all information coming from the higher level node. The detector detects time markers in this information, specifying the beginning of the received piece of information, and transmits it to the timer T. Simultaneously, the serially received information is stored in the switch receiving register SRR. The timer T reads the information from the switch receiving register at moments of time specified by the signal from the detector output DS. Next, the timer T checks whether the received information is addressed to it. If so, it reads out, from that information, the sequence of time points at which it is to perform configuration change in the multiplexer in the output block O_B, that is switching the indicated path from the particular inputs from the lower level nodes In_S to the output to the higher level node Out_M. The information from the higher level node to the lower level nodes is transmitted via the input block I_B without any switching.

The higher level device can be a master node M or other switches SW. The lower level devices can be slave nodes S or other switches SW.

The switch SW sends, via data transmission paths, information received from a higher level node to all lower level nodes without any modification to information contents and without storing the information in its registers. Similarly, information received from a lower level node is forwarded to a higher level node without any modifications and without storing the information in the switch registers. The switch operates by configuring output block connections to form communication paths, including a small surplus, for the time required to send the information.

In such a system, the information propagation time is substantially the same for both transmission directions. This guarantees identical delay in transmission from lower level nodes to higher level nodes and vice versa. The switch does not modify the transmitted information, so it is transparent in both directions of data transmissions. From the perspective of the higher level node, the switch requires only a small computation effort to configure the link at the system initialization stage, which later needs to be periodically corrected.

The invention claimed is:

1. A method for synchronization and transmission of information in a distributed measurement and control system, wherein frames, being a sequence of bits, are transmitted between a master node and a slave node, the method comprising cyclically performing the steps of:
receiving at the master node an echo frame sent from the slave node as an echo of the last frame received by the slave node from the master node;
determining a time of frame propagation as a difference between a time of receiving the echo frame at the master node and a time of sending the last frame from the master node;
constructing a subsequent frame at the master node, the subsequent frame comprising a data field comprising a time adjustment dependent on the time of frame propagation;
sending the subsequent frame from the master node to the slave node;
receiving the subsequent frame at the slave node; and
adjusting a timer of the slave node depending on the value of the time adjustment read from the received subsequent frame and sending the received frame to the master node as a subsequent echo frame.

2. The method according to claim 1, further comprising setting a value of an echo delay time held in the frame sent from the master node to the slave node and, at the slave node, sending the received frame as an echo frame after expiry of the echo delay time.

3. A distributed measurement and control system comprising a master node and a slave node connected by a physical signal transmission link, wherein:
the master node comprises a digital module configured to:
receive an echo frame sent from the slave node as an echo of the last frame received by the slave node from the master node;
determine a time of frame propagation as a difference between a time of receiving the echo frame at the master node and a time of sending the last frame from the master node;
construct a subsequent frame, the subsequent frame comprising a data field comprising a time adjustment dependent on the time of frame propagation;
send the subsequent frame from the master node to the slave node;
the slave node comprises a digital module configured to:
receive the subsequent frame;
adjust a timer of the slave node depending on the value of the time adjustment read from the received subsequent frame and send the received frame to the master node as a subsequent echo frame.

4. The system according to claim 3, wherein
the digital module of the master node comprises:
a timer;
a frame counter having its input connected to the output of the timer;
a delay counter having its one of two inputs connected to the output of the timer;
a master actuated device having its input connected to the output of the timer;
a master transmission buffer having its one input connected via a bus with the output of the frame counter and its second input connected via a bus to the output of the delay counter output;
a master shift transmitting register having its input connected via a bus with the output of the master transmission buffer and an output as a serial signal output for the slave node;
an input of a serial signal from the slave node connected to a master echo decoder and to a master shift receiving register, the master echo decoder having its output connected to the second input of the delay counter and to the master shift receiving register;
and a direct memory access register to which the outputs of the frame counter, master actuated device and master shift receiving register are connected via buses;
the digital module of the slave node comprises:
an input of a serial signal from the master node connected to a slave shift receiving register and to a synchronisation signal detector having its output connected to the input of the slave shift receiving register;
a slave timer having its inputs connected to the output of the slave shift receiving register via a bus and to the output of the synchronisation signal detector;
a slave actuated device having its input connected to the output of the slave timer and its output connected via a bus to a slave transmitting buffer, the slave transmitting buffer having its other input connected via a bus to the output of the slave shift receiving register and its output connected via a bus to a slave shift transmitting register;
the slave shift transmitting register having its second input connected to the output of the slave timer and its output as a serial signal output for the master node.

5. The system according to claim 3, further comprising a switch connected between a higher level node being a master node or another switch and a plurality of lower level nodes being slave nodes or other switches, the switch configured to transmit information without modification to information contents and with a delay identical in both transmission directions.

6. The system according to claim 5, wherein the switch comprises:

an input block having an input connected to a higher level node and a plurality of outputs connected to lower level nodes;

an output block having a plurality of inputs connected to a lower level nodes and an output connected to a higher level node;

a decision block comprising:
- a shift receiving register and a signal detector connected to the input block;
- a timer having its one input connected via a bus to the shift receiving register and another input connected to the signal detector and an output connected to the output block.

* * * * *